United States Patent Office 2,926,029
Patented Feb. 23, 1960

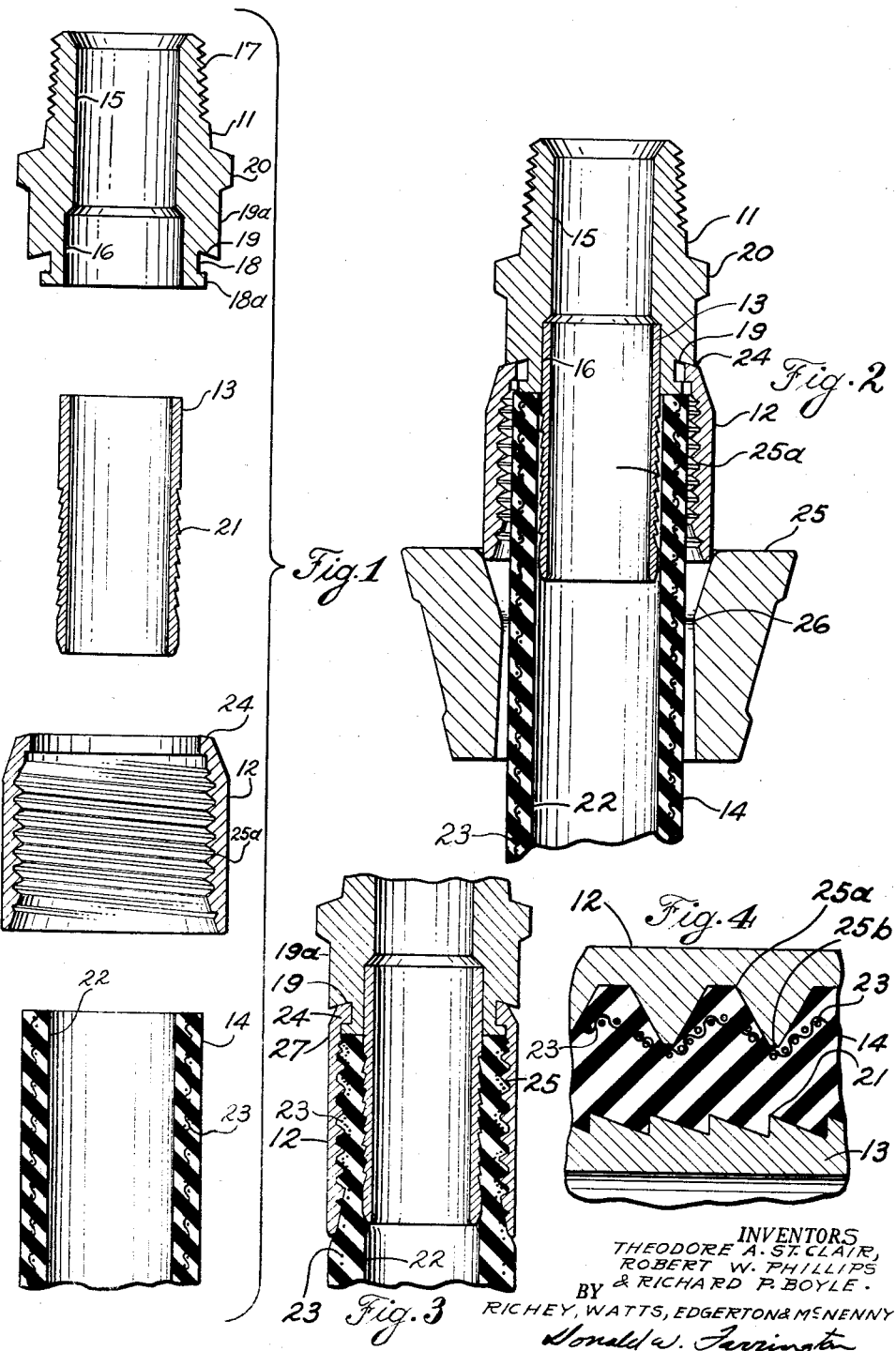

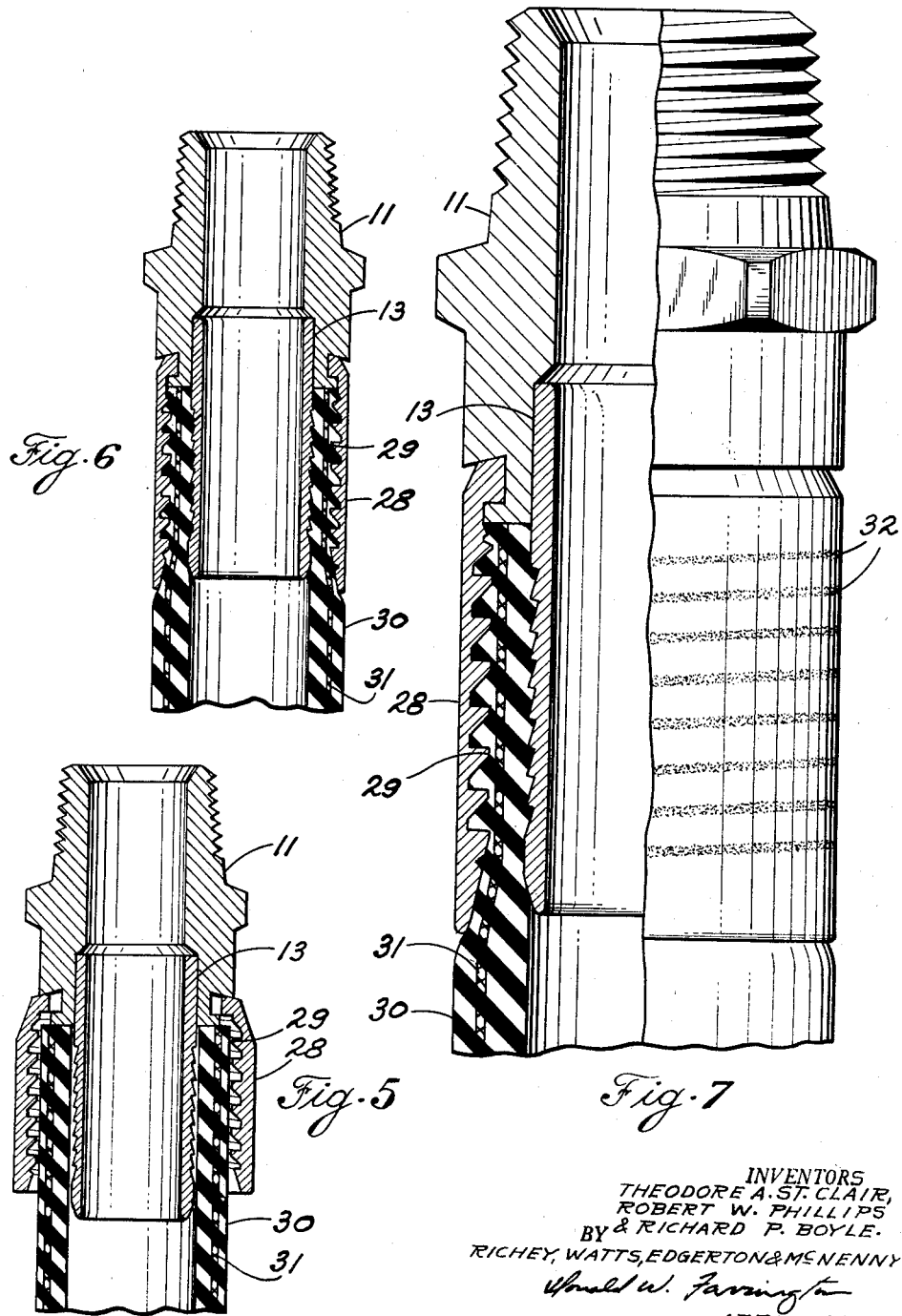

2,926,029

HOSE COUPLING HAVING UPSET LOCKING MEANS

Theodore A. St. Clair, South Euclid, Robert W. Phillips, Cleveland, and Richard P. Boyle, Maple Heights, Ohio, assignors to The Weatherhead Company, Cleveland, Ohio, a corporation of Ohio Application April 14, 1955, Serial No. 501,364

1 Claim. (Cl. 285—256)

This invention relates to hose ends for hose couplings for use with flexible rubber-like hose.

The hose end of the preferred embodiment is of the permanently assembled type and comprises three initially disassembled members which are forced into final assembled relation for permanently engaging the hose end. For the assembly of the hose end it is not necessary to skive the end of the hose.

According to this invention, a metal body is provided with a longitudinal bore therethrough and an annular groove is provided near the end of the body having a radially inclined wall. An insert nipple member having a longitudinal opening therethrough is press fitted into a counterbore in the body member and the nipple member is brazed into said counterbore. The outer diameter of the nipple is slightly less than the bore diameter of a hose to be placed thereon.

A sleeve member having a forward flange is sized to fit over the outside diameter of the hose so that the forward flange abuts a portion of the inclined wall of the annular groove in the body member. The sleeve member is provided with annular or spiral grooves on its inner bore adapted to engage the hose when the assembly is forced into an extruding die. It has been determined, however, that spiral grooving of the sleeve member is more economical.

The hose end according to our invention is characterized by a metal body having one end machined to provide three adjoining cylindrical portions. The extreme end portion 18a has a diameter slightly less than the outer diameter of the hose to be gripped. It will be understood from Figs. 1 and 3 that after the hose is gripped by the hose end, the outer diameter of the hose is reduced so as to conform to the diameter of the first cylindrical portion 18a. The next cylindrical portion 18 has a smaller diameter than the first cylindrical portion 18a. A radial wall normal to the axis of the fitting joins the two cylindrical portons 18 and 18a. The third cylindrical portion 19a has a diameter which exceeds the diameter of the first cylindrical portion 18a. The wall 19 which joins the cylindrical portions 18 and 19a is inclined away from the end of the fitting so that a re-entrant groove is formed having a cylindrical section 18 at the bottom of the groove. Re-entrant, as used herein, is intended to define the groove having one radial wall and one inclined wall so that the entrance to the groove is narrower than the bottom wall of the groove as at 18.

The sleeve for the fitting of our invention as illustrated in Fig. 1 is machined so as to provide an internal flange at one end of the sleeve. The inside diameter of the flange is slightly larger than the diameter of the cylindrical portion 18a of the body so that the flanged end of the sleeve will slip over the cylindrical section 18a and the flanged end of the sleeve will abut the inclined wall at 19. The end wall of the sleeve as at 24 is inclined to correspond to the inclination of the wall 19. The axial extent of the flange at its inside diameter corresponds to the opening in the groove of the body.

Accordingly, when the sleeve is extruded, as hereinafter described, the flange portion of the sleeve is upset in the re-entrant groove and is thus locked in position somewhat in the manner of a dovetailed joint. The extrusion operation reduces the diameter of the sleeve to a diameter corresponding to the maximum diameter of the body at cylindrical section 19a.

The forward flange of the metal sleeve member is upset in the re-entrant groove as the flange is forced against the inclined wall portion of the groove by the extruding action of a die surrounding the sleeve. This inclined wall is particularly adapted to cause the forward flange to substantially fill the re-entrant groove, as a portion of the axial forces acting on the flange are translated into inwardly-directed radial forces by the inclined portion thus funneling the forward flange material into the re-entrant groove. This results in an upsetting action in the forward flange portion. Without such inclined portion the forward flange of the sleeve member would tend to flare outwardly or bell away from the groove. The upsetting of the flange increases the strength of the flange at the portion adjoining the main sleeve portion. This results in an improved hose end capable of withstanding greater longitudinal forces acting in tension than the prior art devices.

Upon submitting the assembly to the extruding operation, the forward flange on the sleeve is reduced in diameter and fills the annular groove, the sleeve member is elongated by extrusion and achieves substantially the same outside diameter as the body, with the hose being captured between the sleeve and the nipple.

The hose secured between the sleeve member and the insert member by the extrusion of the sleeve may be of molded rubber, neoprene or the like. The hose of the preferred embodiment consists of two layers of rubber having a reinforcing layer therebetween. The reinforcing layer in one form of the preferred embodiment is a wire braid and in another form of our embodiment the reinforcing layer is cotton braid.

Specifically, we disclose grooves in the inner bore of the sleeve member particularly adapted for shearing into a hose that is not skived. Elimination of the skiving operation is particularly advantageous for it eliminates a costly and time-consuming hand operation in preparing the hose end for assembly. By the proper proportioning of the grooves in the inner bore of the sleeve member the hose is secured between the sleeve member and the insert member by the extruding action on the sleeve.

When using a hose having wire braid reinforcement the teeth cooperating with the groove are forced through the upper layer of rubber until the teeth contact the wire braid and position it in a direction normal to the axis of the bore of the sleeve member. Such distortion of the wire braid results in shaping the wire braid so that at the groove portion there exists a wire braid having one diameter and where the teeth have acted upon the wire braid there is a resultant smaller diameter of the wire braid. With the wire braid so distorted by the action of the inner bore of the sleeve member the hose is further secured from longitudinal forces acting on the hose from the hose end.

With cotton braid reinforcement in the hose, grooves are formed with teeth having a blunt configuration—for example, of the buttress type. During the extruding action on the sleeve member the teeth are sheared into the outer layer of rubber but do not pass through the cotton braiding. However, substantial compressive forces exist at each portion between the blunt tooth and the insert member for securing the hose in the hose end assembly.

It is important, whether using cotton braid or wire braid reinforcement in the hose, that the amount of rubber displaced by the shearing action of the teeth into the hose have sufficient space to flow into. By balancing the cross-sectional area of the teeth in relation to the cross-sectional area of the groove a space is provided so that the displaced rubber fills the groove and, in so filling the groove, prevents the possibility of "cold-flow" of the rubber.

A particular object of our invention is to provide a sleeve member for a hose end assembly adapted to secure unskived metal braid hose.

Another object of our invention is to provide a sleeve member provided with means to shear into the hose and engage the reinforcement of said hose for securing the hose within the assembly.

The principal object of our invention is to provide a flanged sleeve member engageable with an annular groove having a radially inclined wall which provides for an upsetting of a sleeve flange as the outer diameter of the sleeve is reduced.

Another object of our invention is to provide a hose end assembly in which the hose is permanently affixed without undue shearing or abrading of the inner and outer hose surfaces.

In the drawings:

Fig. 1 discloses the elements of the hose end structure prior to assembly;

Fig. 2 is a sectional view of the hose end prior to the extruding operation;

Fig. 3 is a sectional view of the completed extruded hose end assembly;

Fig. 4 is an enlarged partial section showing the details of the groove portion of the extruded sleeve in relation to wire braid reinforcement;

Fig. 5 is a section of a hose end assembly adapted for use with hose having a layer of cotton braid for reinforcement;

Fig. 6 is a sectional view of the hose end assembly of Fig. 5 after extrusion of the sleeve; and Fig. 7 is an enlarged view of the completed hose end assembly disclosing the relation of the threaded portion of the sleeve and the reinforced hose.

In Fig. 1 the unassembled members of the hose end are shown in section. The hose 14 is shown provided with a wire braid reinforcement 23. The body member 11 is provided with a bore 15 and a counterbore 16 for the nipple and is exteriorly threaded at one end as at 17. An annular re-entrant groove is formed between the end cylindrical section 18a and the cylindrical section 19a. A hexagonal portion 20 is provided adjacent the cylindrical section 19a to facilitate securing the body 11 when threadably engaged with another device (not shown). A nipple insert 13 is adapted to be press fitted into counterbore 16 and is brazed therein. A portion of the outer surface of nipple 13 is provided with downwardly inclined ridge members 21, the function of which will be described hereafter. A rubber-like neoprene hose 14 is provided with an inner bore 22 adapted to be slipped over the outer diameter of insert 13. Reinforcing wire of the hose 14 is shown as at 23.

An annular sleeve member 12 is provided with an annular inwardly extending flange 24 and grooves 25. The sleeve is adapted to slip over the outside of hose 14 until flange member 24 abuts inclined wall 19.

An extruding die 25 is shown in Fig. 2 provided with a throat 26 having an inside diameter corresponding to the diameter of the body section 19a which determines the outer diameter of the sleeve after it has passed through the die. The assembled parts of the hose end are shown in Fig. 2 in position to be extruded. The die 25 may be made in complementary halves so as to be separated after the sleeve is extruded.

As the die 25 and the assembled hose end are moved relative to each other with the shoulder 26 engaging the sleeve, the forces acting at inclined wall 19 upset the metal of the sleeve member causing flange 24 to substantially fill the re-entrant annular groove. The upsetting also thickens the metal portion as at 27 where the sleeve flange 24 joins the main portion of the sleeve.

As the sleeve member 12 is extruded through die 25, the teeth 25b of the sleeve are caused to shear into hose 14. The teeth 25b are so proportioned that the rubber displaced by the shearing action of the teeth flows to fill the groove 25a completely so that no "cold-flow" of the rubber will occur after assembly. Also, the teeth 25b are forced into intimate contact with wire reinforcement 23 to deform the wire as shown in Fig. 3 and in the enlarged section of Fig. 4. It can be appreciated that with the wire deformed as shown in Figs. 3 and 4 the hose is so gripped as to resist forces tending to pull the hose from the gripping relation established between the sleeve member and the insert member.

The resulting hose end assembly thus provides a compact assembly that is simple to manufacture. It is further noted that it is not necessary to skive the end of the hose prior to assembly, and unskived hose is securely gripped by the action of the extruded sleeve member on the hose in conjunction with the insert here provided.

Referring now to Figs. 5, 6 and 7 a sleeve member 28 similar to that shown in Fig. 1 is disclosed but the member is different in that the internal bore is provided with buttress-type threads 29. A sleeve having buttress threads is to be used in conjunction with hose 30 having cotton braid reinforcement 31. The threads 29 are blunted so that in extrusion of the sleeve member 28, as shown in Figs. 6 and 7, through a die similar to die 25 the threads do not pierce the cotton braiding of the hose but rather secure the hose by compressive forces acting between the flat face of the threads and the insert member 13. It is important that the teeth and the spacing therebetween be proportioned so that the rubber displaced by the teeth forced into the hose during the extruding operation fills the space between the teeth to prevent "cold-flow" of the rubber after final assembly.

During the extrusion of the sleeve high pressure areas corresponding to the threads 29 are burnished by the extrusion die at the outer surface of the sleeve. The high pressure burnished areas are shown at 32 in Fig. 7.

Although we have described one form of our invention in detail, it will be understood by those skilled in the art that numerous modifications may be made therein without departing from the scope of the invention as defined in the following claim.

What is claimed is:

A hose end assembly comprising a metal body having a central fluid bore therethrough, the exterior of the body having a polygonal cross-section intermediate the ends thereof to provide flat wrench faces, one end of said body being threaded and the other end of said body being formed with three adjoining cylindrical portions, said portions comprising a first cylindrical portion adjacent said flat wrench faces, a second cylindrical portion of lesser diameter than said first cylindrical portion and being joined to said first cylindrical portion by a wall inclined inwardly toward the threaded end of the body, a third cylindrical portion at the end of the body, said third cylindrical portion having a diameter intermedate the diameters of said first and second cylindrical portions, said third cylindrical portion being joined to said second cylindrical portion by a radial wall normal to the axis of the central bore through the body, said inclined wall, said radial wall and said second cylindrical portion forming a groove with an entrance having a lesser axial extent than the axial extent of said second cylindrical portion, a tubular nipple having one end thereof secured to said body and adapted to be inserted projecting from the bore of the hose to be coupled, a cylindrical sleeve having an inturned flange at one end thereof, the inner diameter of said flange corresponding to the diameter of said second cylindrical portion, the end wall of said flange being inclined with respect to the central axis of the body at the same angle as the inclined wall joining said first and said second cylindrical portions, said flange having an axial extent at its inner diameter corresponding to the axial extent of said second cylindrical portion and thereby prevent withdrawal of the flange from the said entrance to said groove, said sleeve projecting axially from said body in spaced relation to said tubular nipple and having a spiral groove at the interior thereof to provide portions adapted to indent the outer wall of the hose to be coupled.

References Cited in the file of this patent

UNITED STATES PATENTS

| | | |
|---|---|---|
| 244,804 | Gillespie | July 26, 1881 |
| 1,092,464 | Watson | Apr. 7, 1914 |
| 1,926,270 | Eastman | Sept. 12, 1933 |
| 2,050,993 | Bush | Aug. 11, 1936 |
| 2,121,624 | Cowles | June 21, 1938 |
| 2,133,313 | Weatherhead | Oct. 18, 1938 |
| 2,144,117 | Miller | Jan. 17, 1939 |
| 2,310,536 | Melsom | Feb. 9, 1943 |

FOREIGN PATENTS

| | | |
|---|---|---|
| 853,232 | Germany | Oct. 23, 1952 |